US012754991B2

(12) United States Patent
Belfy et al.

(10) Patent No.: US 12,754,991 B2
(45) Date of Patent: *Oct. 6, 2026

(54) NEURAL NETWORK DIGITAL SIGNATURE ENCODING METHOD, DEVICE AND CORRESPONDING COMPUTER PROGRAM

(71) Applicant: THALES, Meudon (FR)

(72) Inventors: Henri Belfy, Toulouse Cedex (FR); Tom Fougere, Toulouse Cedex (FR)

(73) Assignee: THALES, Meudon (FR)

( * ) Notice: Subject to any disclaimer, the term of this patent is extended or adjusted under 35 U.S.C. 154(b) by 5 days.

This patent is subject to a terminal disclaimer.

(21) Appl. No.: 18/613,102

(22) Filed: Mar. 22, 2024

(65) Prior Publication Data

US 2024/0330431 A1 Oct. 3, 2024

(51) Int. Cl.
*H04L 9/32* (2006.01)
*G06F 21/44* (2013.01)
*G06T 1/00* (2006.01)

(52) U.S. Cl.
CPC .............. *G06F 21/44* (2013.01); *G06T 1/005* (2013.01); *G06T 2201/0053* (2013.01); *G06T 2201/0065* (2013.01)

(58) Field of Classification Search
CPC ....... G06F 21/44; G06T 1/05; G06T 2201/53; G06T 2201/65; G09C 5/00; H04L 9/3247; H04L 2209/16; H04L 2209/608
USPC ............................................................ 726/19
See application file for complete search history.

(56) References Cited

U.S. PATENT DOCUMENTS 8,892,893 B2 * 11/2014 Horne ...................... H04K 1/00 717/124
2007/0192474 A1 * 8/2007 Decasper ............. H04L 67/306 709/223
2010/0052852 A1 * 3/2010 Mohanty ............. B42D 25/333 380/243
2020/0351657 A1 * 11/2020 Wentz ................... H04L 9/3231
2023/0033054 A1 * 2/2023 Schlueter ............. H04L 9/3247

FOREIGN PATENT DOCUMENTS

WO WO-2022217354 A1 * 10/2022 ............. G06T 1/005
WO 2023041212 A1 3/2023

OTHER PUBLICATIONS

A. Fierro-Radilla et al., "A Robust Image Zero-watermarking using Convolutional Neural Networks," 2019 7th International Workshop on Biometrics and Forensics (IWBF), Cancun, Mexico, 2019, pp. 1-5, doi: 10.1109/IWBF.2019.8739245. (Year: 2019).*

(Continued)

*Primary Examiner* — Meng Vang
(74) *Attorney, Agent, or Firm* — Soquel Group LLC

(57) ABSTRACT

A method for encoding a digital signature of a neural network, implemented by an electronic device, the neural network being stored within a data structure including blocks of parameters. The method includes, for a current block of parameters including at least M parameters representing real numbers: an operation of acquiring a signature binary image from the digital signature including a set of bits extracted from parameters of the current block of parameters, and an operation of combining the signature binary image with a reference binary image delivering a coded binary image.

12 Claims, 5 Drawing Sheets

(56) References Cited

OTHER PUBLICATIONS

Yue Li et al: "A survey of deep neural network watermarking techniques", arxiv.org, Cornell University Library, 201 Olin Library Cornell University Ithaca, NY 14853, Mar. 16, 2021 (Mar. 16, 2021).
Reda Bellafqira et al: "DICTION: DynamIC robusT white bOx watermarking scheme", arxiv.org, Cornell University Library, 201 Olin Library Cornell University Ithaca, NY 14853, Oct. 27, 2022 (Oct. 27, 2022).
"Securing Artificial Intelligence (SAI); Traceability of AI Models", ETSI Draft Specification; SAI 010, European Telecommunications Standards Institute (ETSI), 650, Route Des Lucioles ; F-06921 Sophia-Antipolis ; France, No. V0.0.8 Mar. 15, 2023 (Mar. 15, 2023), pp. 1-33.
Mingfu Xue et al: "DNN Intellectual Property Protection: Taxonomy, Methods, Attack Resistance, and Evaluations", arxiv.org, Cornell University Library, 201 Olin Library Cornell University Ithaca, NY 14853, Nov. 27, 2020 (Nov. 27, 2020).
FR 2303043, INPI Rapport de Recherche Preliminaire, Nov. 9, 2023, 3 pages.

* cited by examiner

NEURAL NETWORK DIGITAL SIGNATURE ENCODING METHOD, DEVICE AND CORRESPONDING COMPUTER PROGRAM

CROSS-REFERENCE TO RELATED APPLICATIONS

This application is a U.S. non-provisional application claiming the benefit of French Application No. 23 03043, filed on Mar. 29, 2023, which is incorporated herein by reference in its entirety.

TECHNICAL FIELD OF THE INVENTION

The present invention relates to the field of protection of neural networks. More particularly, the invention relates to the protection of data resulting from training called parameters, which are used for the inference of a neural network.

BACKGROUND OF THE INVENTION

Neural networks are increasingly deployed and marketed in a wide variety of real-world scenarios because of the performance same achieve, in particular in classification and prediction tasks. Training a deep neural network is a very expensive process that requires (i) the availability of massive quantities of data, often proprietary, capturing different scenarios within a target application; (ii) significant computing resources; (iii) assistance from deep learning experts to carefully adjust the topology of the network (e.g., type and number of hidden layers), and correctly define the training hyper-parameters, such as learning rate, batch size, etc. Consequently, high-performance neural networks require significant investments and should be protected accordingly. The above is particularly important when the neural network is implemented within embedded equipment: such equipment can be used to recover the neural network and use same in other contexts or other equipment.

Digital watermarking techniques for protecting neural networks, are known. With such techniques, the trained neural network is marked. A read process is then used for discovering the watermark(s) inserted within the data structure. Two main types of techniques are known for watermarking neural networks: the "black box" techniques, and the "white box" techniques.

In the case of white box watermarking, the watermarking decoder extracts the digital watermark(s) from the parameters of the neural network. The above can concern the extraction of a message inserted within the network or the detection of a watermark.

Black box techniques essentially consist of the insertion of one or a plurality of digital watermarks which are revealed when the neural network is asked a specific question. Throughout the decoding or detection process, the architecture and internal parameters of the neural network are completely blind to the decoder or the detector. In other words, the only elements that can be controlled are the inputs used to interrogate the network and the outputs corresponding to interrogations correlative to the requests.

The two types of techniques can be used for the same neural network. However, digital watermarks are sometimes erased or removed by attackers. Such a situation occurs when, e.g., the neural network initially hacked undergoes too many modifications (suppression of a plurality of layers, retraining, pruning, quantization). In such a situation, watermarking processes (which, as a general rule, try to disrupt the network as little as possible) may prove to be insufficient and unable to allow the watermark to be preserved. It is thus necessary to propose a technique allowing the origin of all or part of a neural network be perceived, even if the neural network has undergone significant modifications after having been hidden.

SUMMARY OF THE INVENTION

A goal of the invention is to propose a technique for encoding the digital signature of a neural network, in a white box, which serves to solve the problems raised by the prior techniques, in particular the problem of robustness. Another goal of the invention is also to provide a technique that makes the comparison between an original network and a hidden network easier to view.

To this end, the invention relates to a method for encoding a digital signature of a neural network, which method is implemented by an electronic device, the neural network being stored within a data structure including blocks of parameters. Such a method includes, for a current block of parameters including at least M parameters representing real numbers:

- acquiring a signature binary image from the digital signature including a set of bits extracted from parameters of the current block of parameters; and
- combining the signature binary image with a reference binary image delivering an encoded binary image.

Thereby, the method serves to identify the origin of a neural network, e.g., when same is used in unauthorized devices or during operations of cyber-attack analysis.

According to a particular feature, the operation of acquiring includes:

- determining, from a first predetermined factor, a set of N parameters to be processed, N being less than or equal to M;
- acquiring, from at least one second predetermined factor, a set of K bits to be processed, for each of the parameters of the set of N parameters to be processed, delivering a set of P bits; and
- producing, from the P bits of the set of bits, the signature binary image.

According to a particular feature, the combining includes, for each bit of the reference binary image, the calculation of a combined bit using a corresponding bit of the signature binary image.

According to a particular feature, the calculation of the combined bit preferentially consists of an "exclusive OR" operation.

According to a particular feature, the method is iteratively implemented on a plurality of blocks of parameters of the neural network, delivering a plurality of characteristic binary images, each associated with a block of parameters.

According to another aspect, the disclosure relates to a method for decoding a digital signature of a neural network, which method being implemented by an electronic device, the neural network being stored within a data structure including blocks of parameters. Such a method includes, for a current block of parameters including at least M parameters representing real numbers:

- acquiring a signature binary image from a signature including a set of bits extracted from parameters of the current block of parameters; and
- combining the signature binary image with a coded binary image associated with the current block of parameters, delivering an induced reference binary image.

According to a particular feature, the acquiring includes:

acquiring a first predetermined factor for determining N parameters to be selected, at least a second predetermined factor for acquiring K bits to be processed and a coded binary image of the current block of parameters;

acquiring, from the at least one predetermined factor, a set of K bits to be processed, for each of the parameters of the set of N parameters to be processed, delivering a set of P bits; and producing, from the P bits of the set of bits, a signature binary image.

According to a particular feature, the method further includes comparing the induced reference binary image with a reference binary image.

Henceforth, it is visually easy for an observer to determine whether a neural network block has been subject to unauthorized modification or to an unauthorized appropriation.

According to another aspect, the disclosure further relates to an electronic device for encoding a digital signature of a neural network, the neural network being stored within a data structure including blocks of parameters. Such a device includes, for a current block of parameters including at least M parameters representing real numbers:

means for acquiring a signature binary image from the digital signature including a set of bits extracted from parameters of the current block of parameters; and means for combining the signature binary image with a reference binary image delivering a coded binary image.

According to another aspect, the disclosure further relates to an electronic device for decoding a digital signature of a neural network, the neural network being stored within a data structure including blocks of parameters. Such a device includes, for a current block of parameters including at least M parameters representing real numbers:

means of acquiring a signature binary image from a set of bits of the parameters of the current block of parameters; and means for combining the signature binary image with a coded binary image associated with the current block of parameters, delivering an induced reference binary image.

According to a preferred implementation, the various operations of the methods described are implemented by one or a plurality of software or computer programs, including software instructions to be executed by a data processor of a relay module according to the disclosure and being designed to control the execution of the different operations of the methods. Consequently, the disclosure further relates to a program which may be executed by a computer or by a data processor, the program including instructions for controlling the execution of the operations of the methods as mentioned herein, when the methods are executed by a terminal and/or by an integrated circuit. The program may use any programming language, and may be in the form of source code, object code, or of intermediate code between source code and object code, such as in a partially compiled form, or any other desirable form. The disclosure further relates to an information medium readable by a data processor and including instructions of a program as mentioned hereinabove. The information medium can be any entity or device apt to store the program. For example, the medium may include a means of storage, such as a ROM, e.g., a CD ROM or a microelectronic circuit ROM, or further a magnetic storage means, e.g., a hard disk, a flash memory or a storage memory of another type. On the other hand, the information medium may be a transmissible medium such as an electrical or optical signal, which may be routed via an electrical or optical cable, by radio or by other means. The program according to the disclosure may more particularly be downloaded over an Internet network. Alternatively, the information medium may be an integrated circuit into which the program is incorporated, the circuit being suitable for executing or for being used in the execution of the method in question. In one embodiment, the disclosure is implemented using software and/or hardware components. In such context, the term "module" may correspond in the present document to a software component, to a hardware component or to a set of hardware and software components. A software component corresponds to one or a plurality of computer programs, one or a plurality of sub-programs of a program, or more generally to any element of a program or software apt to implement a function or a set of functions, as described hereinbelow for the module concerned. Such a software component is executed by a data processor of a physical entity (terminal, server, gateway, router, etc.) and may access the hardware resources of such physical entity (memories, storage media, communication buses, electronic input/output cards, user interfaces, etc.). In the same way, a hardware component corresponds to any element of a hardware set apt to implement a function or a set of functions, according to what is described hereinbelow for the module concerned. The hardware component may be a programmable hardware component or a hardware component with an integrated processor for executing software, e.g., an integrated circuit, a smart card, a memory card, an electronic card for executing firmware, etc. Each component of the set described hereinabove implements, of course, its own software modules. The different embodiments and features mentioned may be combined with one another for the implementation of the disclosure.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION

Recalling the Principle

As explained hereinabove, a subject matter of the invention is to provide a technique for encoding the digital signature of a neural network, a technique implemented in a white box, which provides increased resistance to attacks that a neural network may undergo, especially in a context of embedded implementation. Another subject matter of the present invention is thereby to lead to a more efficient identification of a neural network that has been extracted from an embedded device, which was then modified and reinserted into another embedded device, by an attacker who wishes to divert the use of a neural network that does not belong to the attacker, to modify a neural network in order to distort the results thereof, e.g., to carry out a cyber-attack, or further to save money by taking ownership of the research and development work done by a competitor.

The general principle of the invention consists in extracting, from at least one block of parameters of the neural network (previously trained), a signature taking the form of an image, from selected bits of the parameters (digital values) stored in the blocks of parameters. The invention thereby relates to a method for encoding the digital signature of a neural network (previously trained) including a set of blocks of parameters, the blocks of parameters including parameters of the neural network. Such parameters are, e.g., parameters that were subject to training, such as layer weights, biases, tensor values, normalization values, convolution values, etc. Thereby, at least some of the blocks of parameters each include a set of parameters, the number of which is variable depending upon the block in question. In one embodiment, the blocks of parameters include floating real values of a predetermined number of bits, e.g., 16, 32 or 64 bits. In other words, each of the floating real values is, e.g., stored in two, four or eight bytes within a given block, all values being encoded in the same number of bits or bytes. The digital signature encoding method of the invention is executed on the blocks of parameters in order to extract a secret signature therefrom. The method is implemented, e.g., on a neural network stored in onnx format, which has the advantage of having numerous access and modification APIs, regardless of the programming languages used.

Figure 1:
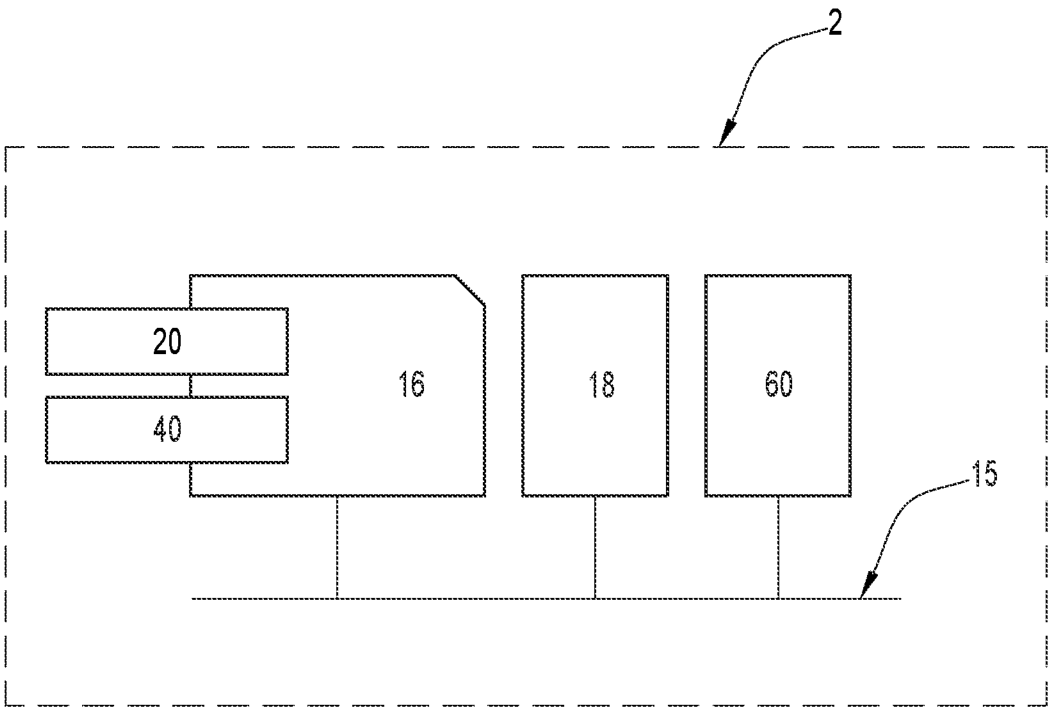
FIG. 1 illustrates a digital signature encoding device implementing the invention according to an exemplary embodiment.

FIG. 1 schematically shows an electronic device for digital signature encoding. The electronic device for digital signature encoding 2 includes a module 20 for acquiring bits to be processed, Sbts; a processing module 40 for bits to be processed, Sbts, depending upon at least one secret datum, which are also called factors, as shown in FIG. 1.

In the example shown in FIG. 1, digital signature encoding device 2 includes an electronic memory unit 16, at least one computation processor 18 and an interface 60 for communication with remote devices, via a selected communication protocol, e.g., a wired protocol and/or a radio communication protocol. The elements of device 2 are suitable for communicating via a communication bus 15.

In the example shown in FIG. 1, acquisition module 20 for acquiring bits to be processed, Sbts, the processing module 40 for processing the bits to be processed, Sbts, depending upon at least one secret datum, are each produced in the form of a software program, or a software brick, which may be run by the processor. The memory of electronic digital signature encoding device 2 is then apt to store acquisition software 20 for acquiring bits to be processed, Sbts, and a processing software 40 for processing bits to be processed, Sbts, depending upon at least one secret datum. The processor is then apt to execute each of the software among the acquisition software for acquiring a message to be watermarked, Msg, and the software for modifying parameters from the blocks of parameters forming the neural network.

In a variant (not shown), acquisition module 20 for acquiring bits to be processed, Sbts, processing module 40 for processing bits to be processed, Sbts, depending upon at least one secret datum, are each produced in the form of a programmable logic component, such as an FPGA (Field Programmable Gate Array), or further of integrated circuit, such as an ASIC (Application Specific Integrated Circuit).

When the electronic device for digital signature encoding device 2 is produced in the form of one or a plurality of software programs, i.e., in the form of a computer program, also called a computer program product, same is further apt to be stored on a computer-readable medium (not shown). The computer-readable medium is, e.g., a medium apt to store the electronic instructions and to be coupled to a bus of a computer system. As an example, the readable medium is an optical disk, a magneto disk, a ROM, a RAM, any type of non-volatile memory, e.g., FLASH or NVRAM, or a magnetic card. A computer program containing software instructions is then stored on the readable medium.

Figure 2:
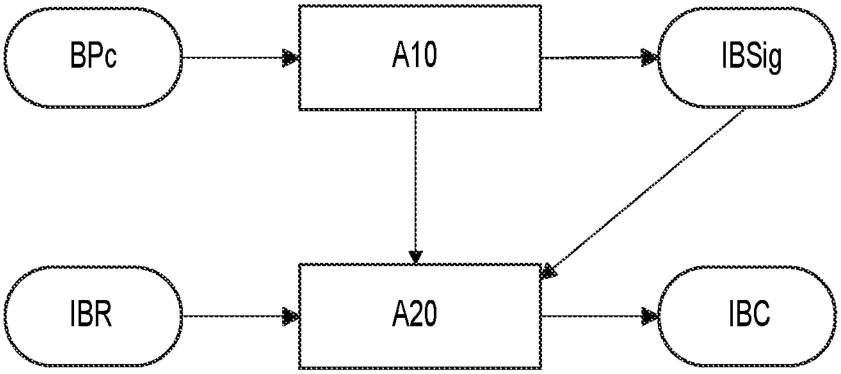
FIG. 2 illustrates a neural network digital signature encoding method, in accordance with an embodiment of the present invention.

With reference to FIG. 2, the neural network digital signature encoding method is implemented by an electronic device as described hereinabove. The neural network is stored in a data structure including blocks of parameters BPc. The method includes, for a current block of parameters BPc including at least M parameters representing real numbers:

- acquiring, A10, a signature binary image, IBSig, from a signature including a set of bits extracted from parameters of the current block of parameters BPc;
- combining, A20, the signature binary image, IBSig, with a reference binary image, IBR, delivering the encoded binary image, IBC.

When the number of parameters stored in the block is large compared to the reference binary image, a smaller number of parameters within the block is selected using a first predetermined factor. For the purposes of the present invention, it is recalled that a binary image, whether same is a reference, characteristic, signature, etc., image, is a two-color raster graphic, e.g., black and white. The binary image is, e.g., encoded in binary form (base 2), or encoded in a more complex form with at least two possible colors, black and white or RGB, by combining a plurality of signatures or portions of only one signature. In general, only one signature is extracted for a current block of parameters. When the block includes many parameters, it is also conceivable to construct more than one signature for the block. In such case, for a given block, the operation of extracting and encoding the signature is repeated so as to produce as many complete signatures as are needed. A redundancy of encoded signatures is thereby obtained for a given neural network block, as explained in detail hereinbelow.

The signature extracted from the bits of the parameters (real values) of a block may be processed so as to take a plurality of forms. In a first example, the signature may be processed so as to take the form of an encrypted string, or the repetition of an encrypted string of characters. In a second example, the signature may be processed so as to take the form of an image. In a third example, the signature may be processed so as to take the form of a transformed, e.g., noisy, image.

In the case of the first example, the character string may be constructed in the following way: a reference character string is defining determined, e.g., a string a copyright, such as "TheCompany1©". The string may have a determined length, e.g., six, twelve, eighteen, twenty-four characters. From the reference character string, an error detection code is calculated (CRC for cyclic redundancy check). The error detection code is concatenated with the reference character string so as to form a codeword. The codeword also has a predetermined size. Although not mandatory, the codeword may then be encoded, e.g., with a reversible pseudo-random transformation, and the encoded codeword may form the base signature with which the signature extracted from the blocks of parameters of the neural network is combined. The encoded codeword is also of predetermined size, e.g., sixty-four, one hundred and twenty-eight or two hundred and fifty-six bits. The size of the codeword is chosen initially depending upon the circumstances and in particular depending on the size of the blocks, e.g., depending on the number of parameters contained in the blocks of parameters, so as to permit, in particular, complete extraction of at least one occurrence of the signature in the blocks of real values, and thereby obtain at least one complete signature in a block.

In the case of the second example, the image to be extracted as a message may be selected so as to visually reproduce a mark of belonging to an entity, e.g., the image may be a company logo. The image is selected so that the size thereof in bits is compatible with at least some of the blocks of parameters, i.e., the image may be combined from bits extracted from a block of parameters. As in the case of the string of characters, it is also possible to calculate an error correcting code and/or transform the encoded image or codeword as in the first example.

Figure 3:
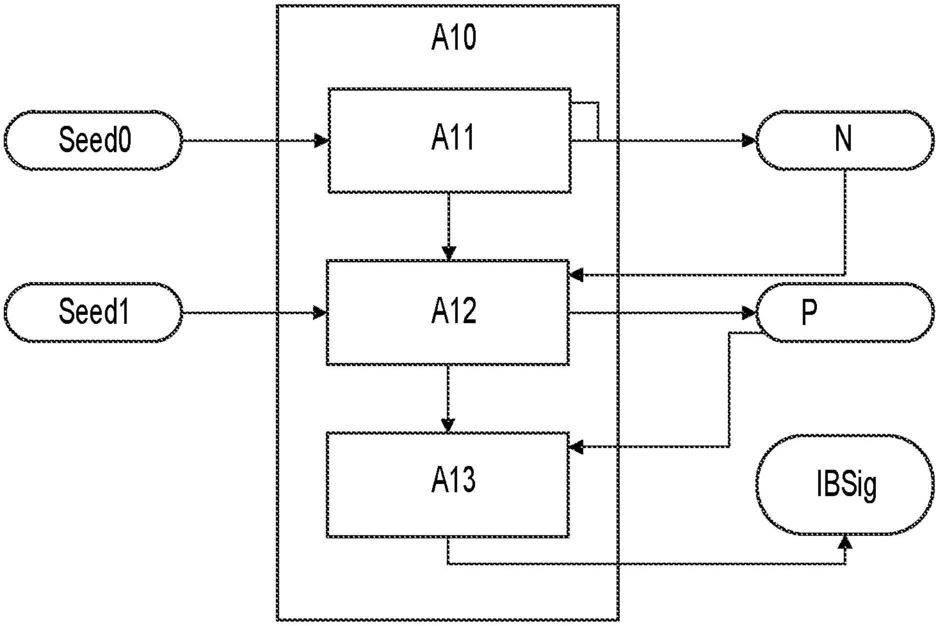
FIG. 3 illustrates an example of implementation of the neural network digital signature encoding method, in accordance with an embodiment of the present invention.

Example of Embodiment for Encoding Signatures of a Block of the Reference Neural Network FIGS. 2 and 3 present, in an exemplary embodiment, the way in which the signature is extracted from a current block of parameters of the neural network, including M different parameters, stored in the form of real numbers.

The method includes:

- An operation A11 of determining, from a first predetermined factor, seed0, a set of N parameters to be processed, N being less than or equal to M;
- An operation A12 acquiring, from at least one second predetermined factor, seed1, a set of K bits to be processed, for each of the parameters of the set of N parameters to be processed, delivering a set of P bits;
- An operation A13 producing a signature binary image, IBSig, from the P bits of the set of bits;
- An operation A20 combining signature binary image IBSig with a reference binary image, IBR, delivering the encoded binary image, IBC;

The number of K bits extracted, per parameter, may be identical for all parameters of a current block or may be different for each parameter of the current block. The above is determined according to requirements and/or an initial parameter setting, (e.g., a different seed1 factor for each parameter. In other words, and more concisely, the proposed method includes combining selected bits, e.g., in a column or a plurality of columns of all or part of the parameters of the current block of parameters, with a reference image belonging to the owner of the neural network. Such combination delivers an encoded binary image which is stored in a database, with information relating to the current block of parameters. The encoded binary image does not necessarily reproduce a visual element. The image is rather displayed as an indistinct global noise.

The procedure described hereinabove is applied to all or part of the blocks of the neural network for which such an operation is interesting. For example, the blocks wherein the values of the parameters are repeated, e.g., the blocks which include predominantly values of one or zero, are not taken into account for producing the characteristic binary images. At the end of the processing of a neural network by the method of the invention, a set of characteristic binary images, stored in a database, each being associated with a particular block, and with a neural network from which the blocks originate, is thus available.

In one example, the bits selected in the blocks are predominantly the most significant bits of the parameters. Thereby, advantage is taken of the fact that the bits have a lesser probability of modification than the least significant bits, in particular, during relearning.

The predetermined factors, seed0 and seed1, are used to select the parameters and bits of the parameters to be used. Depending on the operational implementation conditions, the factors may be common to all the blocks of the neural network or may be individualized, per block. For example, since the size of the blocks may vary within the same neural network, the factors may also vary. In which case, same are saved, within the database with the encoded binary image.

Thereby, the digital signature coding of the block of parameters is invisible. Indeed, insofar as the production of the encoded binary image does not modify the content of the neural network, it is impossible for an attacker to modify the characteristic image.

According to the present invention, the operation of combining signature binary image ISig with reference binary image IBR includes an Exclusive-OR operation (XOR) between the corresponding bits of each image. In other words, the coordinate bit 0.0 of signature binary image ISig is combined with the coordinate bit 0.0 of reference binary image IBR; the coordinate bit 0.1 of signature binary image ISig is combined with the coordinate bit 0.1 of the reference binary image IBR; etc. The images have identical sizes and each bit of signature binary image ISig may be combined with a corresponding bit of reference binary image IBR.

The "Exclusive OR" operation performed on reference binary image IBR with signature binary image ISig makes it possible, within the coding, to make the image randomly noisy using the mask consisting of the signature binary image. Such operation may be carried out by other means or other suitable operations. The object of such operation is, as has been indicated, to be able to retrieve all or part of the reference binary image, even for blocks that have undergone transformations, in a visual way. Thereby, the method implemented is fast, consumes little resources and makes it possible to have available signature data which are resistant to modifications made to the neural network.

Example of Decoding Signatures Extracted with a Modified Neural Network

Figure 4:
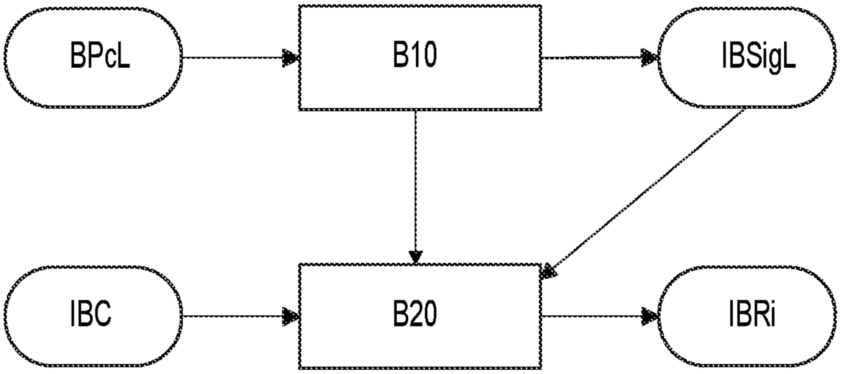
FIG. 4 illustrates a neural network digital signature decoding method, in accordance with an embodiment of the present invention.
Figure 5:
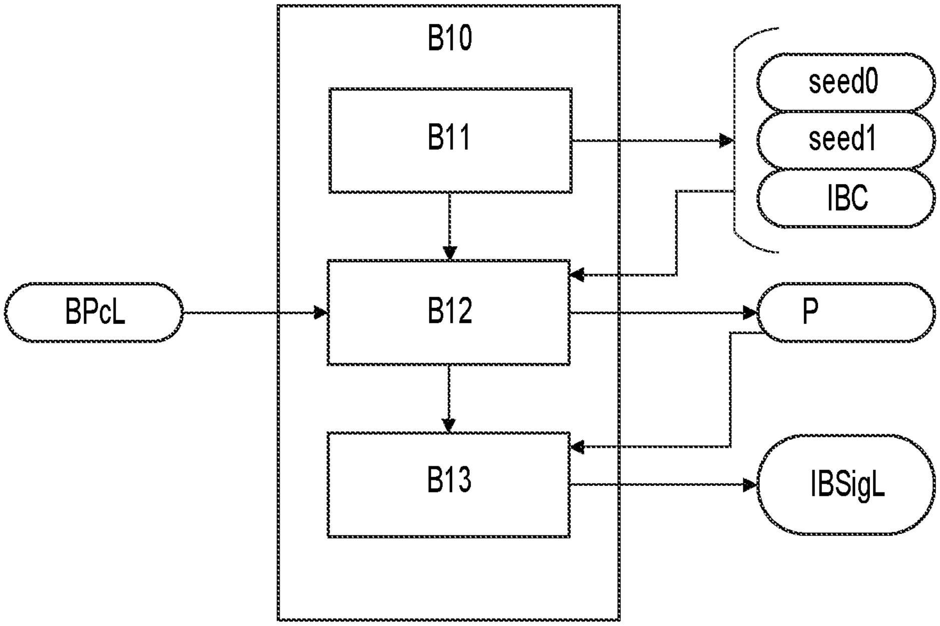
FIG. 5 illustrates an example of implementation of the network digital signature decoding method, in accordance with an embodiment of the present invention.

An example of implementation of the method for decoding the extracted signatures with a modified neural network is described with reference to FIGS. 4 and 5. Decoding consists in making a correlation of the bits extracted from a neural network block to be tested. Thereby, for a current block of parameters BPcL of a neural network, which is suspected to belong to a holder by rights, a signature binary image IBSigL is obtained during step 810 by implementing the following operations:

- acquiring B11 first predetermined factor seed0 relating to the determination of the N parameters to be selected, at least one second predetermined factor seed1 relating to the acquiring of the K bits to be processed and of the coded binary image IBC of the current block of parameters BPcL (the elements are, e.g., stored in a database);
- acquiring B12, from the at least one second predetermined factor seed1, a set of K bits to be processed, for each of the parameters of the set of N parameters to be processed, delivering a set of P bits; and producing B13 from the P bits of the set of bits, the signature binary image IBSigL, representing the signature extracted from the contentious block.

The signature binary image IBSigL is combined 820 with coded binary image IBC, delivering an induced reference binary image, IBRi.

Depending on the modifications undergone by the original block of the neural network, the induced reference binary image corresponds, on a varied scale, to the reference binary image IBR used during the production of the signature. The advantage, however, of such decoding is that same makes it immediately possible to observe the extent of the modifications made on the block of parameters BPcL, through the appearance of the induced reference binary image IBRi.

Let $b'_i$ be a bit of reference binary image IBR, and let $b^s_i$ be the corresponding bit of the signature binary image.

- The coding consists in calculating the bit $b^c_i$ of the coded binary image IBC by: $b^c_i = b^r_i \oplus b^s_i$. $b^c_i$ is the coded bit of $b^r_i$, as explained hereinabove;
- To decode $b^c_i$, bit $b^{s1}_i$ of signature binary image IBSigL extracted from the contentious block is again used and: $b^{r1}_i = b^c_i \oplus b^{s1}_i$ is calculated;
- If bit $b^{s1}_i$ of the contentious block is identical to bit $b^s_i$ of the original block, the result $b^{r1}_i$ of the decoding operation gives $b^r_i$, the bit of reference binary image IBR, and the reference binary image is not modified for this bit; and
- If bit $b^{s1}_i$ of the contentious block is different from bit $b^s_i$ of the original block, the result $br^1_i$ of the decoding operation gives the inverse of bit $b^r_i$, the bit of reference binary image IBR, and the reference binary image is modified for this bit.

Thereby, the decoding operation makes it possible, for a set of bits corresponding to the bits of the signature of the original block, to recover an induced reference binary image, IBRi, which has a variable similarity with encoded binary image IBC saved for the block. Binary induced reference image IBRi may be directly displayed to see the extent of the modifications made on the block of the neural network.

In one example, each block of the contentious neural network is used to extract a signature binary image for the block. Take contentious neural network including Q blocks. Q signature binary images are thus extracted, $IBSigL_0, \ldots, IBSigL_{Q-1}$. According to the invention, a correlation is made between each signature binary image $IBSigL_0, \ldots, IBSigL_{Q-1}$ of the contentious network and each coded binary image $IBC_0, \ldots, IBC_{M-1}$ of the original network, which includes M blocks for which a coded binary image has been coded. In this way, even if the contentious network has undergone transformations consisting, e.g., of inverting blocks, of performing a new learning on certain blocks, or of reducing the size of certain blocks, the global correlation of the network serves nevertheless to obtain a visual representation of the similarities between the two networks.

An error correction based on all the blocks, e.g., by majority, by combination or by automatic threshold may also be performed on all the blocks concerned, in order to recover a more readable version of the image. It is thereby possible to see the presence of reference binary image IBR for a plurality of blocks, even when the neural network parameters are modified.

Selection of Optimal Bit Selection Factors

In a supplementary example of embodiment, the digital signature coding method described hereinabove may be implemented in an optimized way by selecting, in the blocks of parameters, the bit index/indices that best resist the various modifications that the neural network may undergo. More particularly, in such example of embodiment, the original neural network, i.e., before implementation of the digital signature coding, is the reference. The method of the invention is implemented iteratively on degraded versions of the neural network, in order to search for and identify an original signature. In other words, the reference neural network is subjected to a plurality of modifications (layer deletions, pruning, relearning, etc.). A plurality of degraded versions of the reference neural network are obtained, such versions being assumed to be close to the versions an attacker could inflict on the reference neural network. Once such basic materials are available, at least one iteration of the following procedure is implemented:

- Extraction of signatures from the reference neural network, according to the processing method described hereinabove, using common extraction factors; the extracted signatures are stored in a database;
- For each degraded version of the reference neural network, implementation of the signature correlation, as previously described. Correlation results are stored for each degraded version of the reference neural network; and
- Modification of the current extraction factors, e.g., modification of the parameters that are selected in the blocks, e.g., modification of seed0, modification of the indices of the bits selected in the parameters, e.g., modification of seed1.

Once all correlation results have been obtained, the extraction factors that resist best to modifications brought to the reference neural network are retained and are used under operational conditions.

Additional Marking of Document Fields

According to an additional feature, the reference neural network may also be subjected to a watermarking including an operation of marking document fields. Depending on the format used to save the neural network resulting from the training, documentary fields are indeed present. For example, the onnx format contains document fields that may be marked. For example, the following fields may be modified with a secret string of characters:

model.producer_name
model.producer_version
model.doc_string
model.graph.doc_string The secret character string may be in the form of an encrypted codeword. The advantage of the supplementary marking is that same does not need to modify the values inscribed in the neural network. Thus, the marking has no impact on the performance of the neural network. The marking may include a predetermined number of characters, from which an error correcting code is calculated, the resulting codeword being encrypted and encoded, e.g., in base64.

Supplementary Features Relating to the Neural Network

The neural network includes an ordered succession of neuron layers, each of which takes the inputs thereof from the outputs of the preceding layer.

More precisely, each layer includes neurons taking the inputs thereof from the outputs of the neurons of the preceding layer, or from input variables for the first layer.

In a variant, more complex neural network structures may be envisaged with a layer which may be linked to a layer farther away than the immediately preceding layer.

Each neuron is also associated with an operation, i.e., a type of processing, to be performed by the neuron within the corresponding processing layer.

Each layer is linked to the other layers by a plurality of synapses. A synaptic weight is associated with each synapse, and each synapse forms a link between two neurons. Same is often a real number that can take positive as well as negative values. In some cases, the synaptic weight is a complex number.

Each neuron is apt to perform a weighted sum of the value(s) received from the neurons of the preceding layer, each value then being multiplied by the respective synaptic weight of each synapse, or link, between that neuron and the neurons of the preceding layer, then to apply an activation function, typically a non-linear function, to the weighted sum, and to deliver at the output of the neuron, more particularly to the neurons of the next layer connected thereto, the value resulting from the application of the activation function. The activation function is used for introducing a non-linearity in the processing performed by each neuron. The sigmoid function, the hyperbolic tangent function, the Heaviside function are examples of an activation function.

As an optional supplement, each neuron is also apt to apply, in addition, a multiplicative factor, also referred to a bias, to the output of the activation function, and the value delivered at the output of the neuron is then the product of the bias value and of the value coming from the activation function.

A convolutional neural network is referred to by the acronym CNN which refers to the English name "Convolutional Neural Networks".

In a convolutional neural network, each neuron in the same layer has exactly the same connection pattern as the neighboring neurons thereof, but at different input positions. The connection pattern is called a convolution kernel or, more often, the kernel with reference to the corresponding English name.

A fully connected neuron layer is a layer wherein the neurons of the layer are each connected to all the neurons of the preceding layer.

Such type of layer is more often referred to as "fully connected", and sometimes referred to as a "dense layer".

Such types of neural networks are encoded in generic formats such as, e.g., onnx. The present disclosure applies to any type of topology of current neural network supported by such generic format, e.g., "fully connected", CNN, and also RNN (recurrent neural network), "attention layer", etc., which may be represented by one or a plurality of blocks of parameters including values as explained hereinabove.

The invention claimed is:

1. An encoding method, implemented by an electronic device, encoding a digital signature of a neural network, the neural network being stored within a data structure, the neural network comprising blocks of neural network parameters, wherein a current block of neural network parameters comprises at least M neural network parameters representing real numbers, the neural network parameters having been modified during a training of the neural network and being selected from the group consisting of: layer weights, biases, tensor values, normalization values, and convolution values, the encoding method comprising:

acquiring a signature binary image from the digital signature of the neural network, the digital signature comprising a set of bits extracted from the at least M neural network parameters, and the signature binary image being an array of binary pixels;

combining the signature binary image with a reference binary image for delivering an encoded binary image; and using the encoded binary image to authenticate the neural network even when the neural network is modified by an attacker.

2. The method according to claim 1, wherein said acquiring comprises:

determining, from a first predetermined factor, a set of N parameters to be processed, N being less than or equal to M;

acquiring, from at least one second predetermined factor, a set of K bits to be processed, for each of the parameters of the set of N parameters to be processed, delivering a set of P bits; and producing a signature binary image from the P bits of the set of bits.

3. The method according to claim 1, wherein said combining comprises, for each bit of the reference binary image calculating a combined bit using a corresponding bit of the signature binary image.

4. The method according to claim 3, wherein said calculating comprises an "Exclusive OR" operation.

5. The method according to claim 1, wherein the method is iteratively implemented on a plurality of blocks of parameters of the neural network, delivering a plurality of characteristic binary images, each associated with a block of parameters.

6. A non-transitory computer-readable medium including a computer program including software instructions which, when executed by a programmable electronic system, implement a method according to claim 1.

7. An electronic device comprising an encoder encoding a digital signature of a neural network, the neural network being stored within a data structure, the neural network comprising blocks of neural network parameters, wherein a current block of neural network parameters comprises at least M neural network parameters representing real numbers, the neural network parameters having been modified during a training of the neural network and being chosen from the group consisting of: layer weights, biases, tensor values, normalization values and convolution values, the encoder comprising:

means for acquiring a signature binary image from the digital signature of the neural network, the digital signature comprising a set of bits extracted from the at least M neural network parameters, and the signature binary image being an array of binary pixels;

means for combining the signature binary image with a reference binary image for delivering an encoded binary image; and means for using the encoded binary image to authenticate the neural network even when the neural network is modified by an attacker.

8. A decoding method, implemented by an electronic device, decoding a digital signature of a neural network, the neural network being stored within a data structure, the neural network comprising blocks of neural network parameters, wherein a current block of neural network parameters comprises at least M neural network parameters representing real numbers, the neural network parameters having been modified during a training of the neural network and being selected from the group consisting of: layer weights, biases, tensor values, normalization values, and convolution values, the method comprising:

acquiring a signature binary image from the signature of the neural network, the signature comprising a set of bits extracted from the at least M neural network parameters, and the signature binary image being an array of binary pixels;

combining the signature binary image with a coded binary image associated with the current block of parameters, for delivering an induced reference binary; and using the induced reference binary image to authenticate the neural network even when the neural network is modified by an attacker.

9. The method according to claim 8, wherein said acquiring comprises:

acquiring a first predetermined factor for determining N parameters to be selected, at least a second predetermined factor for acquiring K bits to be processed and a coded binary image of the current block of parameters;

acquiring, from the at least one predetermined factor, a set of K bits to be processed, for each of the parameters of the set of N parameters to be processed, delivering a set of P bits; and producing, from the P bits of the set of bits, a signature binary image.

10. The method according to claim 8, further comprising comparing the induced reference binary image with a reference binary image.

11. A non-transitory computer-readable medium including a computer program including software instructions which, when executed by a programmable electronic system, implement a method according to claim 8.

12. An electronic device comprising a decoder decoding a digital signature of a neural network, the neural network being stored within a data structure, the neural network comprising blocks of neural network parameters, wherein a current block of neural network parameters comprises at least M neural network parameters representing real numbers, the neural network parameters having been modified during a training of the neural network and being chosen from the group consisting of: layer weights, biases, tensor values, normalization values and convolution values, the decoder comprising:

means for acquiring a signature binary image from a set of parameter bits of the at least M neural network parameters, the signature binary image being an array of binary pixels;

means for combining the signature binary image with a coded binary image associated with the current block of parameters, for delivering an induced reference binary image; and means for using the induced reference binary image to authenticate the neural network even when the neural network is modified by an attacker.

* * * * *